(12) United States Patent
Wentink et al.

(10) Patent No.: US 9,420,631 B2
(45) Date of Patent: Aug. 16, 2016

(54) WLAN PEER-TO-PEER GROUP OWNER NEGOTIATION

(75) Inventors: Maarten Menzo Wentink, Breukelen (NL); Vincent K. Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 12/894,418

(22) Filed: Sep. 30, 2010

(65) Prior Publication Data

US 2011/0082905 A1    Apr. 7, 2011

Related U.S. Application Data

(60) Provisional application No. 61/248,317, filed on Oct. 2, 2009.

(51) Int. Cl.
*G06F 15/16* (2006.01)
*H04W 84/20* (2009.01)
*H04W 8/00* (2009.01)

(52) U.S. Cl.
CPC .............. *H04W 84/20* (2013.01); *H04W 8/005* (2013.01)

(58) Field of Classification Search
CPC ....... H04L 67/22; H04W 84/20; H04W 8/005
USPC .................. 709/204, 205, 206, 207, 227, 228
See application file for complete search history.

(56) References Cited

U.S. PATENT DOCUMENTS

| 7,451,221 B2 * | 11/2008 | Basani ................ H04L 67/1095 709/208 |
| 7,493,363 B2 * | 2/2009 | Huitema ................ H04L 29/06 709/204 |
| 8,954,502 B1 * | 2/2015 | Kopikare .............. H04L 67/104 709/204 |
| 2002/0055978 A1 | 5/2002 | Joon-Bo et al. |
| 2005/0059420 A1 | 3/2005 | Salokannel et al. |
| 2005/0261013 A1 * | 11/2005 | Natsuno ................ G06Q 30/02 455/466 |
| 2007/0249341 A1 | 10/2007 | Chu et al. |
| 2009/0276537 A1 * | 11/2009 | Deverick ............... H04L 63/061 709/237 |
| 2011/0010246 A1 * | 1/2011 | Kasslin .............. G06Q 30/0267 705/14.64 |
| 2011/0026504 A1 * | 2/2011 | Feinberg ................. H04W 4/08 370/338 |

(Continued)

FOREIGN PATENT DOCUMENTS

CN    101513100 A    8/2009
JP    H11346215 A    12/1999

(Continued)

OTHER PUBLICATIONS

"The Wi-Fi alliance", "Peer-to-Peer Technical specification", May 12, 2009, pp. 1-107.*

(Continued)

*Primary Examiner* — Dhairya A Patel
(74) *Attorney, Agent, or Firm* — Paul Kuo (57) ABSTRACT

A method of operating a first wireless device includes sending a first message including a first intent to be a group owner and a value to a second wireless device. In addition, the method includes receiving a second message including a second intent to be the group owner from the second wireless device. Furthermore, the method includes determining which of the first wireless device or the second wireless device should be the group owner based on the first intent, the second intent, and the value.

15 Claims, 10 Drawing Sheets

(56) References Cited

U.S. PATENT DOCUMENTS

2011/0045851 A1* 2/2011 Maddox ................ H04W 4/06
455/466
2011/0225305 A1* 9/2011 Vedantham ........... G06F 1/3203
709/227

FOREIGN PATENT DOCUMENTS

| JP | 2002111689 A | 4/2002 |
|----|--------------|--------|
| JP | 2006033399 A | 2/2006 |

OTHER PUBLICATIONS

International Search Report and Written Opinion—PCT/US2010/051206, International Search Authority—European Patent Office—Feb. 4, 2011.
The Wi-Fi Alliance, "Peer to Peer Technical specification", May 12, 2009, pp. 1-107.
High Rate Ultra Wideband PHY and MAC Standard, ECMA-368, ECMA International, Dec. 2008, 3rd Edition, pp. 182, 223-225.
Taiwan Search Report—TW099133606—TIPO—Jul. 15, 2013.

* cited by examiner

| Field | Size (Octets) | Value | Description |
|---|---|---|---|
| Attribute ID | 1 | 4 | Type of P2P Attribute |
| Length | 2 | 1 | Length of the following fields in the attribute |
| Group Owner Intent | 1 | Variable | Information used to decide which P2P device will be the next P2P Group Owner |

FIG. 7A

| Bit(s) | Information | Value | Notes |
|---|---|---|---|
| 0 | Tie Breaker | 0 or 1 | Indicates which device becomes the Group Owner when the intent values are the same. |
| 1-7 | Intent | 0 - 15 | Relative value between 0 and 15 used to indicate the desire of the P2P device to be the P2P Group Owner, with a larger value indicating a higher desire. |

WLAN PEER-TO-PEER GROUP OWNER NEGOTIATION

CROSS-REFERENCE TO RELATED APPLICATION(S)

This application claims the benefit of U.S. Provisional Application Ser. No. 61/248,317, entitled "WLAN Peer-to-Peer Group Owner Negotiation" and filed on Oct. 2, 2009, which is expressly incorporated by reference herein in its entirety.

BACKGROUND

1. Field

The present disclosure relates generally to communication systems, and more particularly, to wireless local area network (WLAN) peer-to-peer group owner negotiation.

2. Background

WLAN devices can discover each other and share data traffic, without the instance of a traditional access point, by forming a peer-to-peer network. To form a peer-to-peer network, one of the devices should be a group owner. To determine the group owner between two devices, the two devices participate in a group owner negotiation, during which the two devices exchange their relative intent to function as a group owner. When the two devices indicate the same intent to be the group owner, a method is needed for determining the group owner in a fair way.

SUMMARY

In an aspect of the disclosure, a method of operating a first wireless device includes sending a first message including a first intent to be a group owner and a value to a second wireless device. In addition, the method includes receiving a second message including a second intent to be the group owner from the second wireless device. Furthermore, the method includes determining which of the first wireless device or the second wireless device should be the group owner based on the first intent, the second intent, and the value.

In an aspect of the disclosure, an apparatus for wireless communication includes means for sending a first message including a first intent to be a group owner and a value to a second apparatus. The apparatus further includes means for receiving a second message including a second intent to be the group owner from the second apparatus. The apparatus further includes means for determining which of the apparatus or the second apparatus should be the group owner based on the first intent, the second intent, and the value.

In an aspect of the disclosure, a computer program product in a first wireless device includes a computer-readable medium. The computer-readable medium includes code for sending a first message including a first intent to be a group owner and a value to a second wireless device. The computer-readable medium further includes code for receiving a second message including a second intent to be the group owner from the second wireless device. The computer-readable medium further includes code for determining which of the first wireless device or the second wireless device should be the group owner based on the first intent, the second intent, and the value.

In an aspect of the disclosure, an apparatus for wireless communication includes a processing system. The processing system is configured to send a first message including a first intent to be a group owner and a value to a second apparatus, to receive a second message including a second intent to be the group owner from the second apparatus, and to determine which of the apparatus or the second apparatus should be the group owner based on the first intent, the second intent, and the value.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 1:
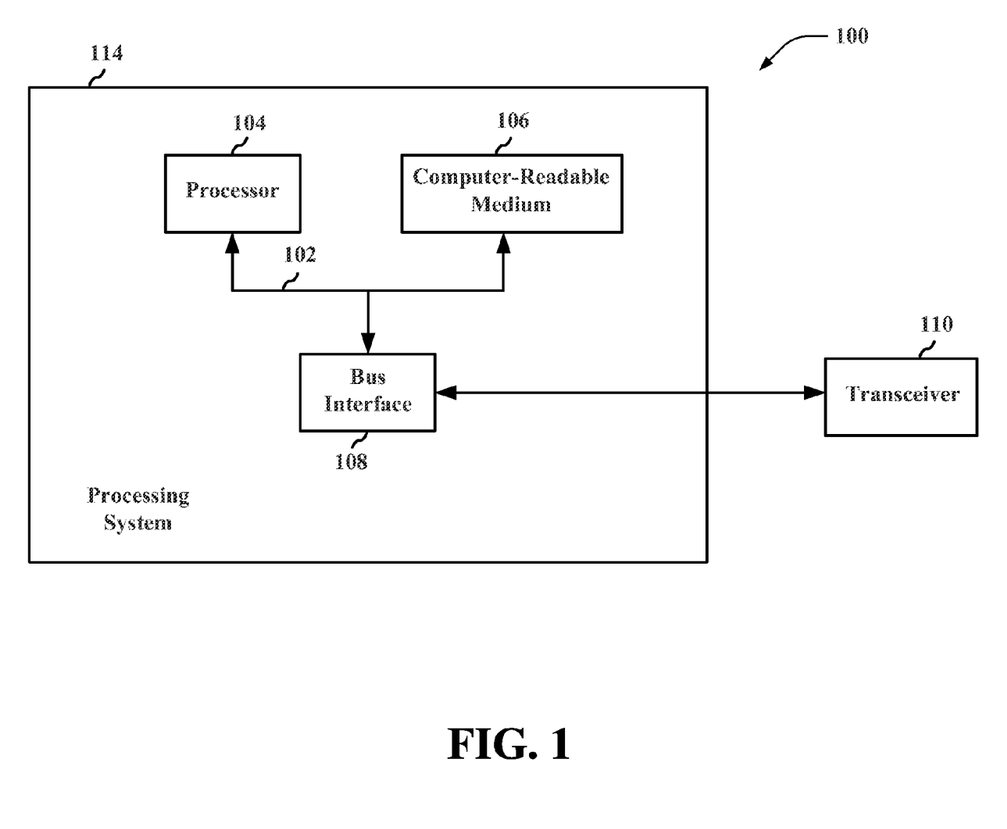
FIG. 1 is a diagram illustrating an example of a hardware implementation for an apparatus employing a processing system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
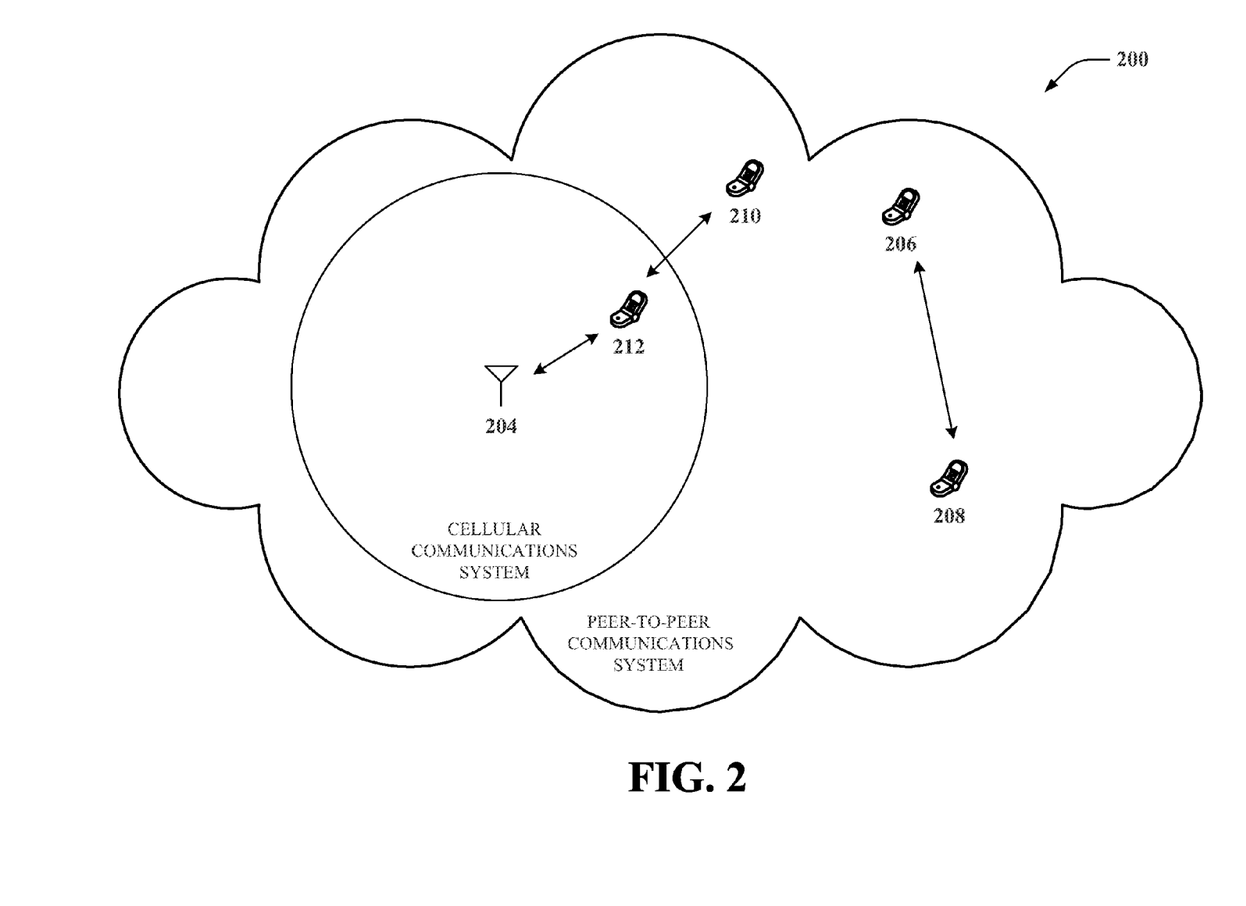
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
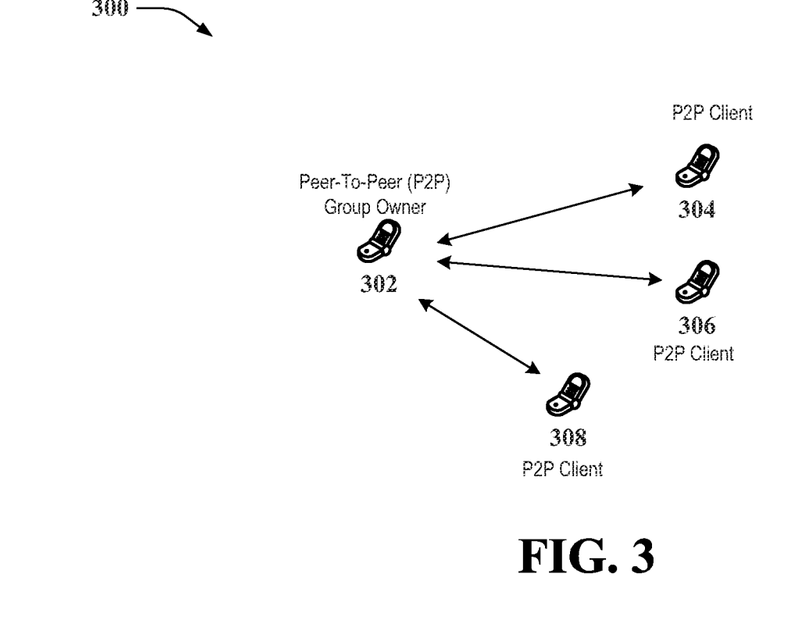
FIG. 3 is a diagram illustrating peer-to-peer topology between a peer-to-peer group owner and peer-to-peer clients.

FIG. 3 is a diagram 300 illustrating a peer-to-peer topology between a peer-to-peer group owner and peer-to-peer clients. A peer-to-peer group of peer-to-peer devices includes one peer-to-peer group owner and one or more clients connected to the group owner. As shown in FIG. 3, the wireless device 302 is the peer-to-peer group owner and the wireless devices 304, 306, 308 are peer-to-peer clients connected to the peer-to-peer owner.

Figure 4:
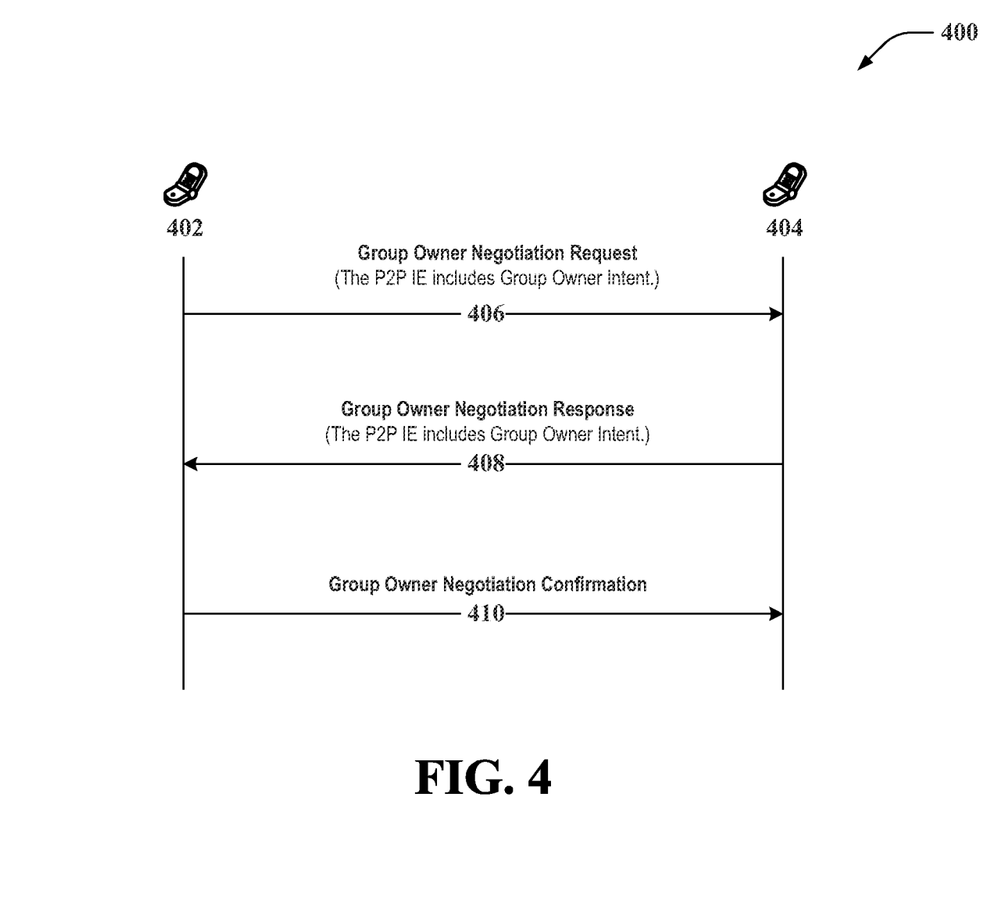
FIG. 4 is a diagram illustrating group owner negotiation message exchange.

FIG. 4 is a diagram 400 illustrating a group owner negotiation message exchange. To determine the peer-to-peer group owner between two devices, the two devices participate in group owner negotiation. As shown in FIG. 4, the wireless device 402 sends a group owner negotiation request 406 to the wireless device 404. The group owner negotiation request 406 includes a peer-to-peer information element (IE), which includes a Group Owner Intent attribute including a group owner intent value indicating the intent of the wireless device 402 to be group owner. Any range of values may be used to indicate intent. In one example, the values range from 0 to 15, with 0 indicating no desire to be the group owner and 15 indicating a necessity to be the group owner. The wireless device 404 responds to the request by sending a group owner negotiation response 408. The group owner negotiation response 408 includes a peer-to-peer IE, which includes a Group Owner Intent attribute including a group owner intent value indicating the intent of the wireless device 404 to be group owner. If group ownership is decided between the wireless devices 402, 404, the wireless device 402 responds to the group owner negotiation response 408 with a group owner negotiation confirmation 410.

Figure 5:
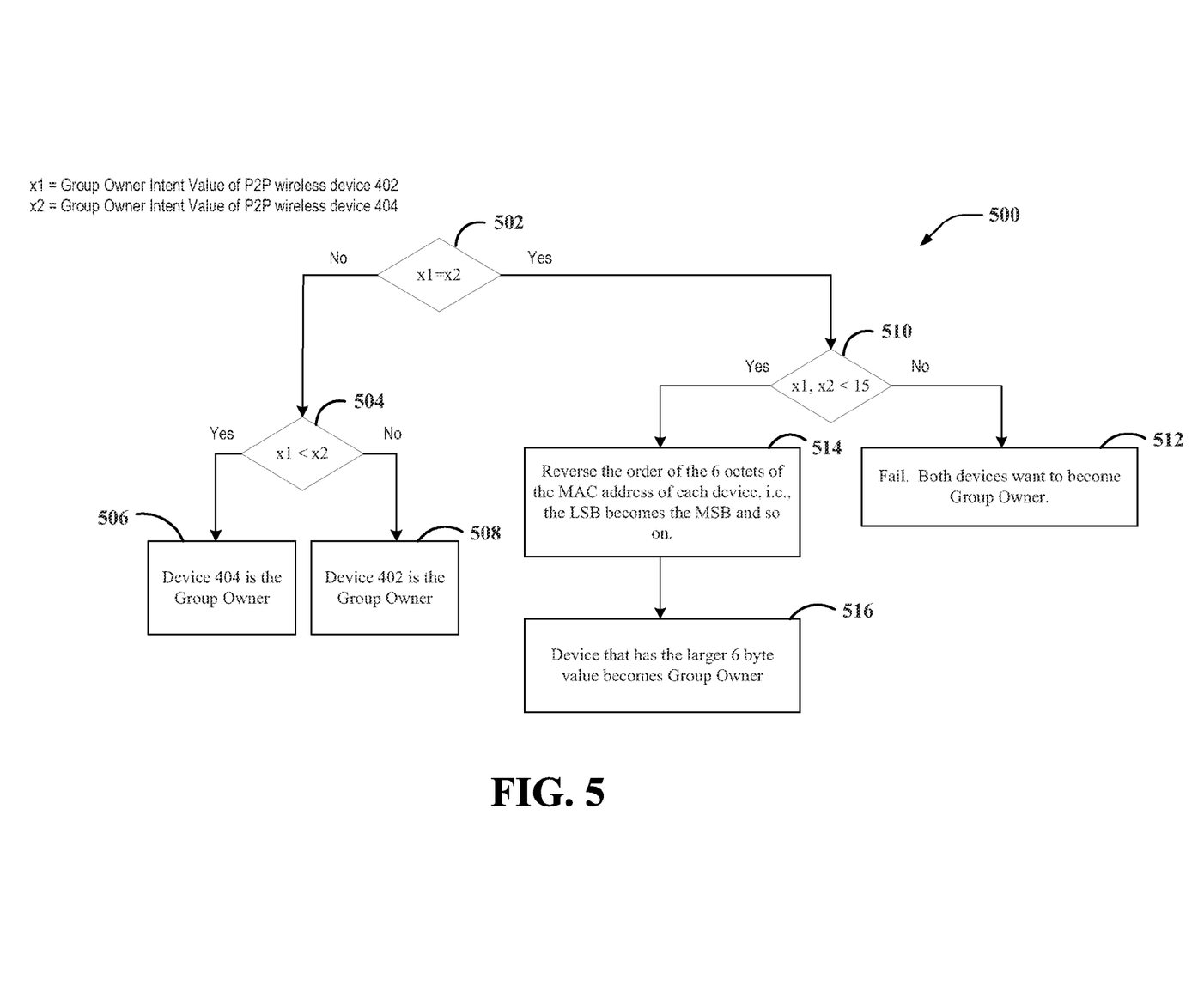
FIG. 5 is a diagram illustrating group owner determination.

FIG. 5 is a diagram 500 illustrating group owner determination. The value x1 is the group owner intent value of the wireless device 402 and the value x2 is the group owner intent value of the wireless device 404. If x1 does not equal x2 (502), and x1 is less than x2 (504), then the wireless device 404 is the group owner (506). Otherwise, if x1 is not less than x2 (504), then the wireless device 402 is the group owner (508). If x1 equals x2 (502), and both x1 and x2 are equal to 15 (or equal to a value indicating a necessity to be group owner) (510), then the group owner negotiation fails due to both wireless devices 402, 404 wanting to be group owner (512). Otherwise, if both x1 and x2 are less than 15, then group ownership is determined based on the MAC addresses of the wireless devices 402, 404 (514, 516). The reverse order of the six octets of the MAC address of each of the wireless devices 402, 404 are used to determine the group ownership (514). The wireless device that has the larger six byte value becomes the group owner (516).

As discussed supra, being group owner requires more power and therefore being the group owner may not be beneficial. As such, a device may be disproportionately burdened with being the group owner based on its MAC address. As such, a method is provided in FIG. 6 for determining the group owner when the group owner intent is the same for two devices participating in group owner negotiation.

Figure 6:
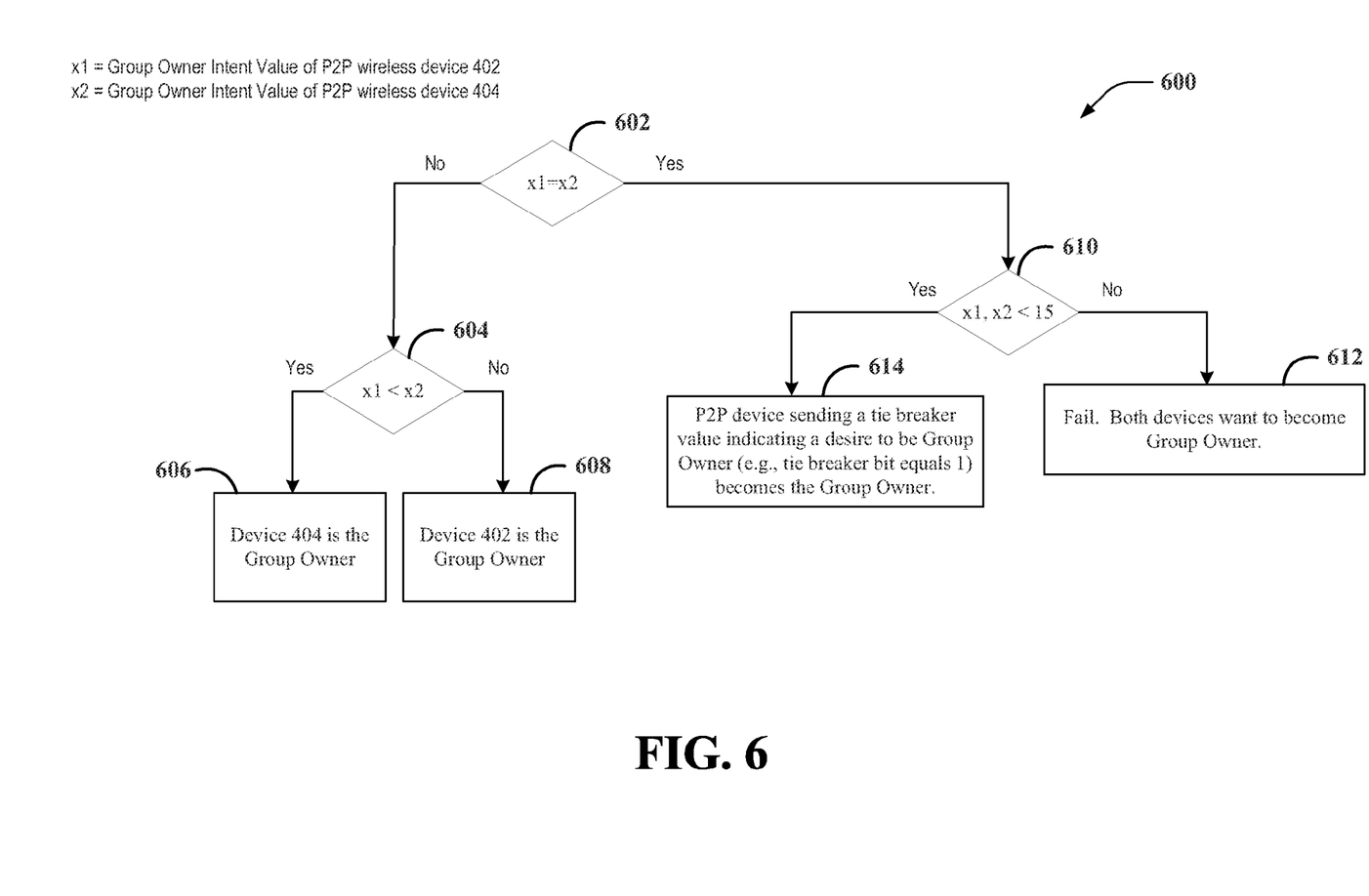
FIG. 6 is a diagram illustrating an exemplary method of group owner determination.

FIG. 6 is a diagram 600 illustrating an exemplary method of group owner determination. The value x1 is the group owner intent value of the wireless device 402 and the value x2 is the group owner intent value of the wireless device 404. If x1 does not equal x2 (602), and x1 is less than x2 (604), then the wireless device 404 is the group owner (606). Otherwise, if x1 is not less than x2 (604), then the wireless device 402 is the group owner (608). If x1 equals x2 (602), and both x1 and x2 are equal to 15 (or equal to a value indicating a necessity to be group owner) (610), then the group owner negotiation fails due to both wireless devices 402, 404 wanting to be group owner (612). Otherwise, if both x1 and x2 are less than 15, then group ownership is determined based on a tie breaker value sent by the wireless device 402, 404 (614).

Referring again to FIG. 4, in an exemplary configuration, the group owner negotiation request 406 includes a tie breaker value. That is, the Group Owner Intent attribute may include a tie breaker value. The tie breaker value may be a bit, for example, with 0 indicating that a tie between the wireless devices 402, 404 with respect to group owner intent is settled by the receiving device becoming group owner and a 1 indicating that the tie is settled by the sending device becoming group owner. The tie breaker value may be set randomly by the wireless device 402 on the first group owner negotiation request 406. The tie breaker value sent in the group owner negotiation response 408 by the wireless device 404 may be toggled from the corresponding group owner negotiation request 406. For example, if the group owner negotiation request 406 includes a tie breaker value of 0, then the group owner negotiation response 408 will include a tie breaker value of 1, and therefore wireless device 404 will become the group owner in case of a tie. On the other hand, if the group owner negotiation request 406 includes a tie breaker value of 1, then the group owner negotiation response 408 will include a tie breaker value of 0, and therefore the wireless device 402 will become the group owner in case of a tie. The tie breaker may be set such that values 0 and 1 have equal occurrence or close to equal occurrence, on average.

Figure 7A:
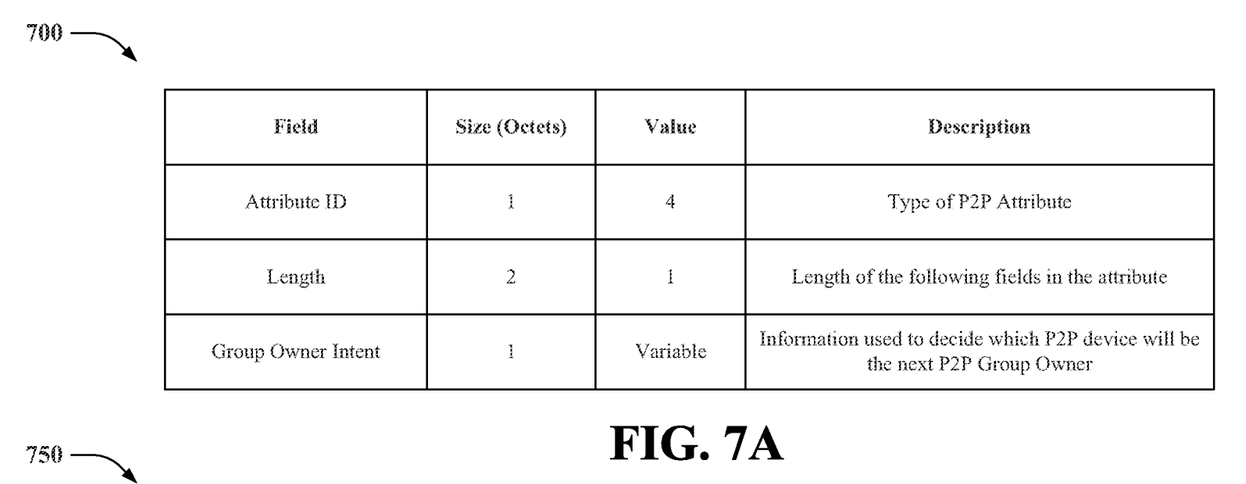
FIG. 7A is a table showing an exemplary Group Owner Intent attribute format.

FIG. 7A is a table 700 showing an exemplary Group Owner Intent attribute format. As shown in FIG. 7A, the Group Owner Intent attribute includes an attribute identifier (ID) field, a length field, and a group owner intent field. The attribute ID field is shown as 4, but may be any predetermined value used to indicate that the attribute is for group owner intent. The length field is the length of the following fields in the attribute. The group owner intent field is a variable value as shown in FIG. 7B.

Figure 7B:
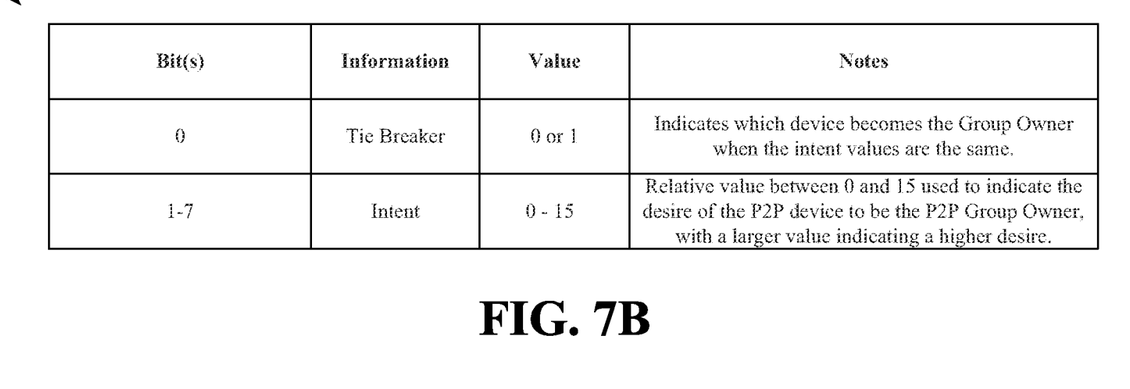
FIG. 7B is a table showing an exemplary group owner intent field definition.

FIG. 7B is a table 750 showing an exemplary group owner intent field definition. The group owner intent field includes a group owner intent value for indicating a degree of intent of being the group owner. The group owner intent value may be a relative value between 0 and 15 used to indicate the degree of desire of the wireless device in being the group owner. A 0 may indicate no desire and a 15 may indicate a necessity to be group owner, with values in between 0 and 15 indicating a degree of intent of being the group owner in between the extremes. Although the intent value is indicated being between 0 and 15, other values may be used to indicate the group owner intent. The group owner intent field also includes a tie breaker value, which as discussed supra, may be a bit, with a 0 indicating the device receiving the group owner negotiation message with the Group Owner Intent attribute should be the group owner and a 1 indicating the device sending the group owner negotiation request message with the Group Owner Intent attribute should be the group owner. The tie breaker value is used when the intent values in the group owner request message and group owner response message are the same and less than 15.

Figure 8:
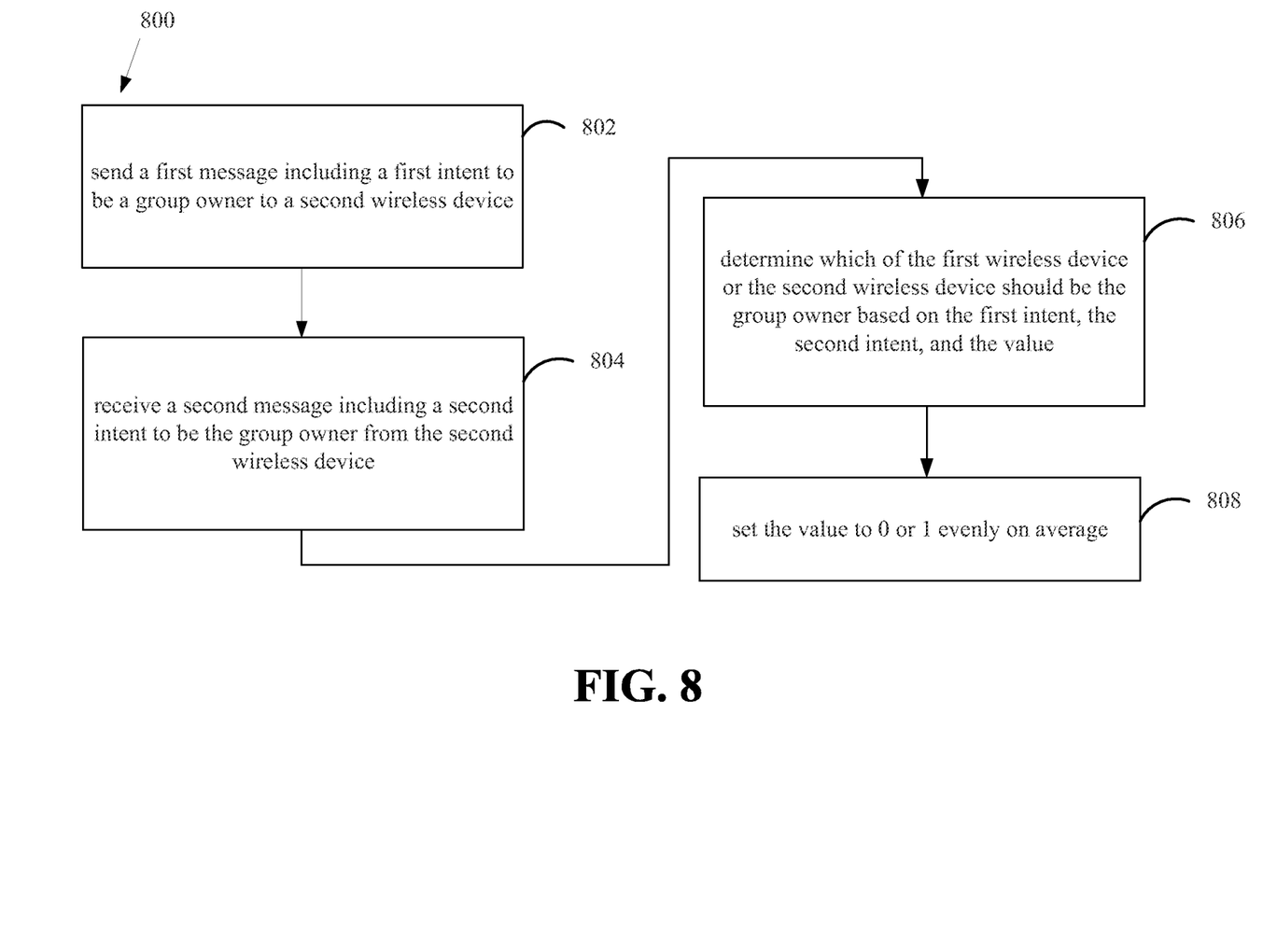
FIG. 8 is a flow chart of a method of wireless communication.

FIG. 8 is a flow chart 800 of an exemplary method. The method is performed by a first wireless device. As shown in FIG. 8, the first wireless device determines a tie breaker value and sends a first message including a first intent and the tie breaker value to be a group owner to a second wireless device (802). The first wireless device receives a second message including a second intent to be the group owner from the second wireless device (804). The first wireless device determines which of the first wireless device or the second wireless device should be the group owner based on the first intent, the second intent, and the tie breaker value (806). The tie breaker value may be a bit. In such a configuration, the first wireless device may cause each tie breaker value to have equal occurrence, on average, and therefore in subsequently sent group owner negotiation request messages, may set the value to 0 or 1 evenly on average (808). In one configuration, selection of the tie breaker value may always be random with an equal probability of selecting a 0 or a 1. Other configurations are possible, as long as the value is set to 0 or 1 evenly on average.

The value may be a tie breaker value used to determine which of the first wireless device or the second wireless device should be the group owner when the first intent is equal to the second intent. The tie breaker value may be used to determine which of the first wireless device or the second wireless device should be the group owner only when the first intent and the second intent both indicate a lack of necessity of being the group owner. The first message may include the value, the second message may include a second value determined based on the value, and the first wireless device may determine which of the first wireless device or the second wireless device should be the group owner further based on the second value. The value and the second value may each be a bit, the second value may be toggled from the value such that the second value is 1 when the value is 0 and the second value is 0 when the value is 1, and the first wireless device may determine which of the first wireless device or the second wireless device should be the group owner is based on which of the value or the second value is a 1. The first message may be a group owner negotiation request and the second message may be a group owner negotiation response.

Figure 9:
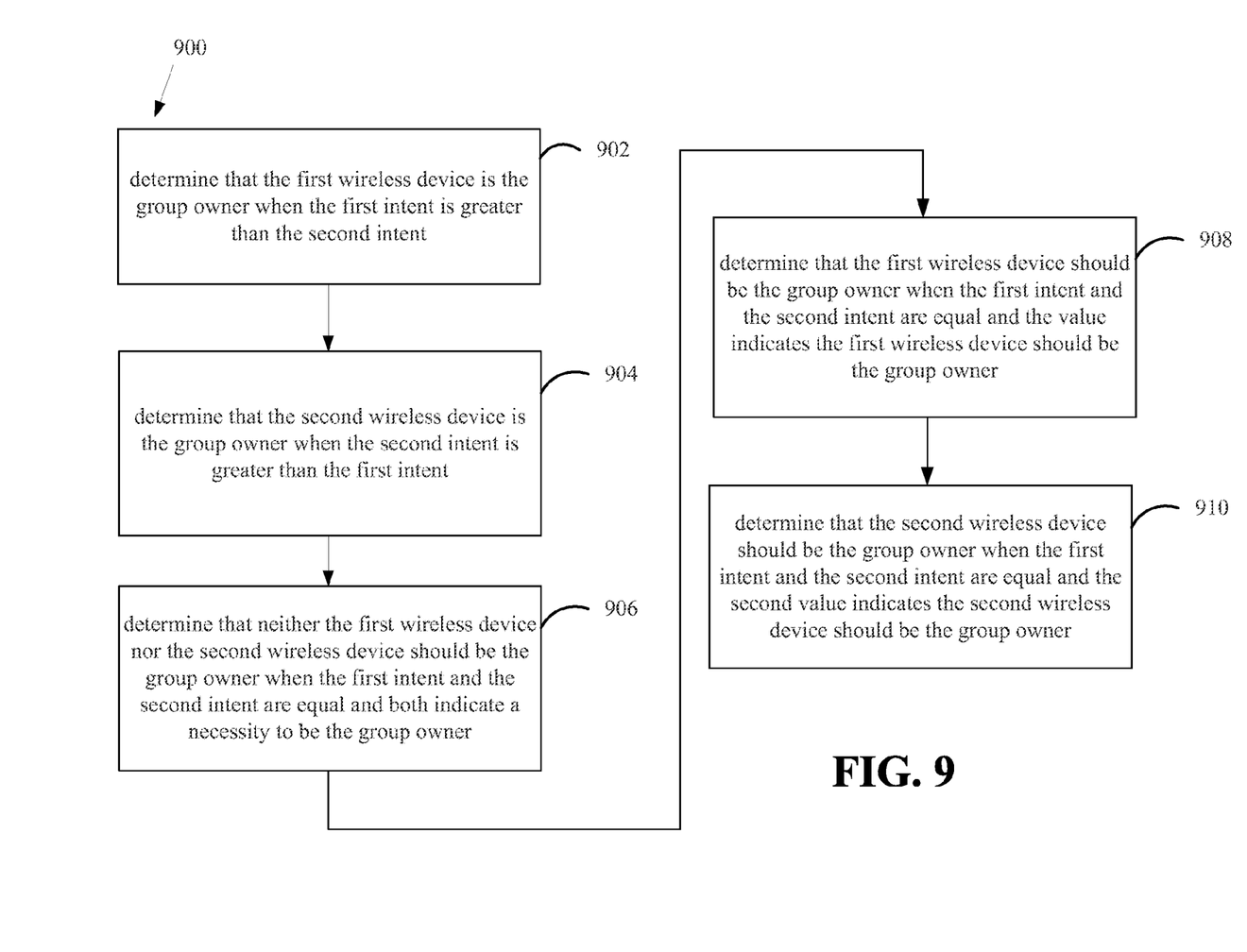
FIG. 9 is another flow chart of a method of wireless communication.

FIG. 9 is a flow chart 900 of an exemplary method. The method is performed by a first wireless device. The second message may include a second value toggled based on the value. In such a configuration, the determining which of the first wireless device or the second wireless device should be the group owner (808) comprises determining that the first wireless device is the group owner when the first intent is greater than the second intent (902), determining that the second wireless device is the group owner when the second intent is greater than the first intent (904), determining that neither the first wireless device nor the second wireless device should be the group owner when the first intent and the second intent are equal and both indicate a necessity to be the group owner (906), determining that the first wireless device should be the group owner when the first intent and the second intent are equal and the value indicates the first wireless device should be the group owner (908), and determining that the second wireless device should be the group owner when the first intent and the second intent are equal and the second value indicates the second wireless device should be the group owner (910).

Figure 10:
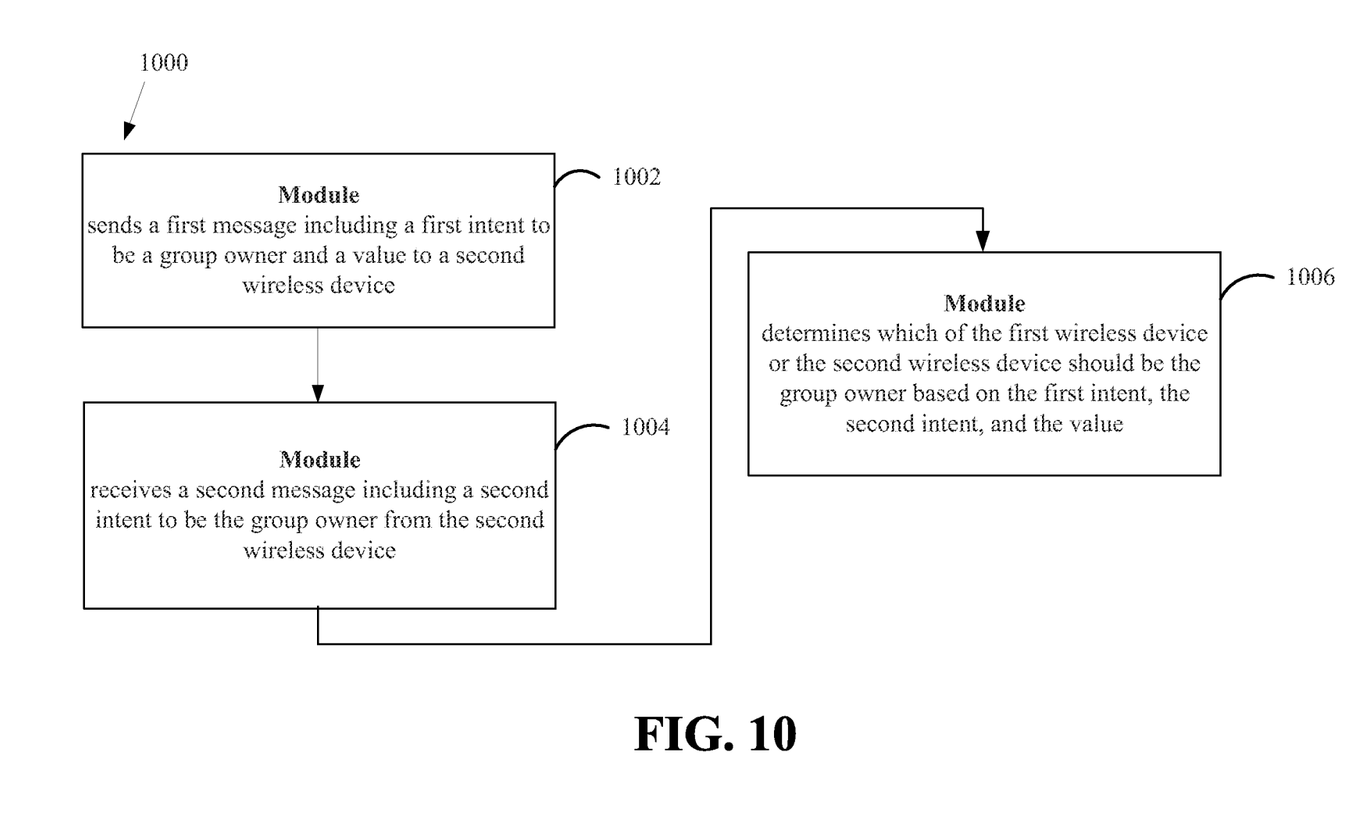
FIG. 10 is a conceptual block diagram illustrating the functionality of an exemplary apparatus.

FIG. 10 is a conceptual block diagram 1000 illustrating the functionality of an exemplary apparatus 100, which is a first wireless device. The apparatus 100 includes a module 1002 that sends a first message including a first intent to be a group owner and a value to a second wireless device. The apparatus 100 further includes a module 1004 that receives a second message including a second intent to be the group owner from the second wireless device. The apparatus 100 further includes a module 1006 that determines which of the first wireless device or the second wireless device should be the group owner based on the first intent, the second intent, and the value.

Referring to FIG. 1, in one configuration, the apparatus 100 for wireless communication includes means for sending a first message including a first intent to be a group owner and a value to a second apparatus, means for receiving a second message including a second intent to be the group owner from the second apparatus, and means for determining which of the apparatus or the second apparatus should be the group owner based on the first intent, the second intent, and the value. In one configuration, the apparatus 100 further includes means for setting the value to 0 or 1 evenly on average. When the second message includes a second value toggled based on the value, the means for determining which of the first wireless device or the second wireless device should be the group owner may further include means for determining that the first wireless device is the group owner when the first intent is greater than the second intent, means for determining that the second wireless device is the group owner when the second intent is greater than the first intent, means for determining that neither the first wireless device or the second wireless device should be the group owner when the first intent and the second intent are equal and both indicate a necessity to be the group owner, means for determining that the first wireless device should be the group owner when the first intent and the second intent are equal and the value indicates the first wireless device should be the group owner, and means for determining that the second wireless device should be the group owner when the first intent and the second intent are equal and the second value indicates the second wireless device should be the group owner. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a first wireless device, comprising:

sending a first message to a second wireless device, the first message including a first variable value corresponding to a first intent to be a group owner, and a tie breaker value that is separate from the first variable value;

receiving a second message from the second wireless device, the second message including a second variable value corresponding to a second intent to be the group owner and a second value based on the tie breaker value, wherein the tie breaker value and the second value are each a bit, the second value is toggled from the tie breaker value such that the second value is 1 when the tie breaker value is 0 and the second value is 0 when the tie breaker value is 1; and determining which of the first wireless device or the second wireless device should be the group owner based on the first variable value and the second variable value, and wherein, when the first variable value is equal to the second variable value, the determining is further based on which of the second value or the tie breaker value is a 1.

2. The method of claim 1, wherein the tie breaker value is used to determine which of the first wireless device or the second wireless device should be group owner when the first variable value and the second variable value both indicate a lack of necessity of being the group owner.

3. The method of claim 1, wherein the first message is a group owner negotiation request and the second message is group owner negotiation response.

4. The method of claim 1, wherein the tie breaker value is a bit and the method further comprises setting the tie breaker value to 0 or 1 evenly on average.

5. The method of claim 1, wherein determining which of the first wireless device or the second wireless device should be the group owner comprises:

determining that the first wireless device is the group owner when the first variable value is greater than the second variable value;

determining that the second wireless device is the group owner when the second variable value is greater than the first variable value;

determining that neither the first wireless device nor the second wireless device should be the group owner when the first variable value and the second variable value are equal and both indicate a necessity to be the group owner;

determining that the first wireless device should be the group owner when the first variable value and the second variable value are equal and the tie breaker value indicates the first wireless device should be the group owner; and determining that the second wireless device should be the group owner when the first variable value and the second variable value are equal and the second value indicates the second wireless device should be the group owner.

6. A wireless device for wireless communication, comprising:

a memory; and a processor, communicably coupled to the memory, configured to:

send a first message to a second wireless device, the first message including a first variable value corresponding to a first intent to be a group owner, and a tie breaker value that is separate from the first variable value;

receive a second message from the second wireless device, the second message including a second variable value corresponding to a second intent to be the group owner and a second value based on the tie breaker value, wherein the tie breaker value and the second value are each a bit, the second value is toggled from the tie breaker value such that the second value is 1 when the tie breaker value is 0 and the second value is 0 when the tie breaker value is 1; and determine which of the wireless device or the second wireless device should be the group owner based on the first variable value and the second variable value, and wherein, when the first variable value is equal to the second variable value, the determining is further based on which of the second value or the tie breaker value is a 1.

7. The wireless device of claim 6, wherein the tie breaker value is used to determine which of the wireless device or the second wireless device should be group owner when the first variable value and the second variable value both indicate a lack of necessity of being the group owner.

8. The wireless device of claim 6, wherein the first message is a group owner negotiation request and the second message is group owner negotiation response.

9. The wireless device of claim 6, wherein the tie breaker value is a bit and the apparatus further comprises setting the tie breaker value to 0 or 1 evenly on average.

10. The wireless device of claim 6, wherein the determining which of the apparatus or the second apparatus should be the group owner comprises:

determining that the wireless device is the group owner when the first variable value is greater than the second variable value;

determining that the second wireless device is the group owner when the second variable value is greater than the first variable value;

determining that neither the wireless device nor the second wireless device should be the group owner when the first variable value and the second variable value are equal and both indicate a necessity to be the group owner;

determining that the wireless device should be the group owner when the first variable value and the second variable value are equal and the tie breaker value indicates the wireless device should be the group owner; and determining that the second wireless device should be the group owner when the first variable value and the second variable value are equal and the second value indicates the second wireless device should be the group owner.

11. A non-transitory computer-readable medium of a first wireless device storing computer executable code, comprising code to:

send a first message to a second wireless device, the first message including a first variable value corresponding to a first intent to be a group owner, and a tie breaker value that is separate from the first variable value;

receive a second message from the second wireless device, the second message including a second variable value corresponding to a second intent to be the group owner and a second value based on the tie breaker value, wherein the tie breaker value and the second value are each a bit, the second value is toggled from the tie breaker value such that the second value is 1 when the tie breaker value is 0 and the second value is 0 when the tie breaker value is 1; and determine which of the first wireless device or the second wireless device should be the group owner based on the first variable value and the second variable value, and wherein, when the first variable value is equal to the second variable value, the determining is further based on which of the second value or the tie breaker value is a 1.

12. The non-transitory computer-readable medium of claim 11, wherein the tie breaker value is used to determine which of the first wireless device or the second wireless device should be group owner when the first variable value and the second variable value both indicate a lack of necessity of being the group owner.

13. The non-transitory computer-readable medium of claim 11, wherein the first message is a group owner negotiation request and the second message is group owner negotiation response.

14. The non-transitory computer-readable medium of claim 11, wherein the tie breaker value is a bit and the non-transitory computer-readable medium further comprises code to set the tie breaker value to 0 or 1 evenly on average.

15. The non-transitory computer-readable medium of claim 11, wherein the code to determine which of the first wireless device or the second wireless device should be the group owner comprises code to:

determine that the first wireless device is the group owner when the first variable value is greater than the second variable value;

determine that the second wireless device is the group owner when the second variable value is greater than the first variable value;

determine that neither the first wireless device nor the second wireless device should be the group owner when the first variable value and the second variable value are equal and both indicate a necessity to be the group owner;

determine that the first wireless device should be the group owner when the first variable value and the second variable value are equal and the tie breaker value indicates the first wireless device should be the group owner; and determine that the second wireless device should be the group owner when the first variable value and the second variable value are equal and the second value indicates the second wireless device should be the group owner.

* * * * *